(12) United States Patent
Diaz Cuellar et al.

(10) Patent No.: US 7,941,838 B2
(45) Date of Patent: May 10, 2011

(54) FIREWALL CONTROL WITH MULTIPLE PROFILES

(75) Inventors: Gerardo Diaz Cuellar, Redmond, WA (US); David Abzarian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 11/891,379

(22) Filed: Aug. 10, 2007

(65) Prior Publication Data

US 2008/0282336 A1    Nov. 13, 2008

Related U.S. Application Data

(60) Provisional application No. 60/928,285, filed on May 9, 2007.

(51) Int. Cl.
*H04L 29/06* (2006.01)

(52) U.S. Cl. ................... 726/11; 726/1; 726/14

(58) Field of Classification Search ............... 726/1, 11, 726/14, 15; 713/191
See application file for complete search history.

(56) References Cited

U.S. PATENT DOCUMENTS

| | | | |
|---|---|---|---|
| 5,968,176 A | 10/1999 | Nessett et al. | |
| 6,219,706 B1 | 4/2001 | Fan et al. | |
| 6,243,815 B1 | 6/2001 | Antur et al. | |
| 7,143,438 B1 | 11/2006 | Coss et al. | |
| 7,146,639 B2 | 12/2006 | Bartal et al. | |
| 7,222,359 B2 | 5/2007 | Freund et al. | |
| 2003/0126230 A1* | 7/2003 | Donatelli et al. | 709/217 |
| 2003/0167405 A1* | 9/2003 | Freund et al. | 713/201 |
| 2004/0243707 A1 | 12/2004 | Watkinson | |
| 2006/0075478 A1 | 4/2006 | Hyndman et al. | |
| 2006/0294584 A1 | 12/2006 | Sundaram | |
| 2007/0027996 A1 | 2/2007 | Stewart | |
| 2007/0067838 A1 | 3/2007 | Bajko | |

OTHER PUBLICATIONS

Bartal, Yair, "Firmato: A Novel Firewall Management Tookit", *ACM Transactions on Computer Systems*, vol. 22, No. 4, Nov. 2004, pp. 381-420.

* cited by examiner

*Primary Examiner* — Edward Zee (57) ABSTRACT

A networked computer with a software firewall that may be configured for any of a number of network contexts may be quickly configured with an appropriate set of rules for a current network context. The computer has multiple profiles, each containing rules applicable to a different network context. When a change in network context is detected, a difference between the profile for the current context and the profile with which the firewall was previously configured is determined. These differences are applied to quickly reconfigure the firewall without blocking, even temporarily, communications that are allowed in the previously configured and current profiles. Additionally, when the networked computer is connected to multiple networks simultaneously, an appropriate profile may be selected.

18 Claims, 6 Drawing Sheets

| ACTION | APPLICATION | DIRECTION | RESTRICTION | PROFILES | ACTIVE |
|---|---|---|---|---|---|
| ALLOW | MSMESSENGER | INBOUND | TCP 80 | PUBLIC, PRIVATE | ☑ |
| ALLOW | RPCSS | INBOUND | TCP 135 | DOMAIN | ☑ |
| BLOCK | NAPSTER | INBOUND | TCP * | ALL | ☑ |

FIG. 5B

| ACTION | APPLICATION | DIRECTION | RESTRICTION | PROFILES | ACTIVE |
|---|---|---|---|---|---|
| ALLOW | MSMESSENGER | INBOUND | TCP 80 | PUBLIC, PRIVATE | ☑ |
| ALLOW | RPCSS | INBOUND | TCP 135 | DOMAIN | ☑ |
| BLOCK | NAPSTER | INBOUND | TCP * | ALL | ☑ |

FIREWALL CONTROL WITH MULTIPLE PROFILES

RELATED APPLICATION

This application claims the benefit under 35 U.S.C. §119(e) of U.S. Provisional Application Ser. No. 60/928,285, filed May 9, 2007. The entire contents of the foregoing application is incorporated herein by reference.

BACKGROUND

Computers are widely used in both business and personal settings. Frequently, the utility of a computer is greatly enhanced by its ability to send or access data over a network. Unfortunately, expanding the functionality of a computer by connecting it with devices operated by other legitimate users also creates the risks that the computer will become connected to devices operated by third parties that may, either unintentionally or maliciously, take actions that cause damage to the computer or the data that it stores. Alternatively, using the network, a third party may improperly gain access to information stored on the computer that was intended to be secret. In these scenarios, rather than enabling desired functionality, the network connection poses a security risk for a computer and its user.

To combat security risks posed by network connections, firewalls are frequently used. A firewall may be a hardware or software component that filters network traffic so that communications with unauthorized third parties are blocked but legitimate network functions may be carried out. Frequently, the filters applied by a firewall are specified by a set of rules defining characteristics of network messages that either should pass through the firewall or that should be blocked.

SUMMARY OF INVENTION

An improved user experience for a user of networked computer that can be connected to multiple networks with different operating characteristics may be provided by configuring the network computer to more quickly reconfigure a firewall for a current network configuration. To facilitate configuring a firewall for different network contexts, firewall rules may be organized into sets of rules, with each set associated with one or more operating characteristics of networks for which the rules in the set are applicable. Upon a change in network configuration, the networked computer may quickly select and apply an appropriate set without unintended disruption of communications over established network connections.

The speed with which a networked computer can adjust to a change in network configuration that results in a change in the applied set of rules can be increased by, upon each change in network configuration, computing differences between a current set of applied firewall rules and a set of firewall rules applicable to a new network configuration. By applying only the differences, the speed with which the new set may be applied is increased. In addition, communication over existing network connections is not unintentionally disrupted when a current set of firewall rules containing rules allowing that communication are deleted.

Operation of a networked computer in an environment in which the networked computer could be simultaneously connected to multiple networks is also enhanced by configuring a networked computer to select an applicable set of firewall rules when the networked computer is connected to multiple networks governed by different sets. In addition to simplifying operation of the networked computer, automatic selection may result in firewall rules being applied that improve operating safety of the networked computer.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a user experience for a user of a networked computer may be greatly improved by simplifying a process by which a firewall may be configured. The process may be simplified by allowing firewall rules to be specified in sets. These sets may be specified by an administrator or other user of the networked computer or by a domain administrator for computers that may be domain-joined, or may be specified in any other suitable way.

Each set of firewall rules, which in the embodiments described below are implemented as "profiles," contains rules applicable in a network context. For example, a profile may be provided for use while the computer is connected to a domain-joined network. Other profiles may be applicable for other types of networks. For example, a user may designate some non-domain joined networks, such as home networks, as "private" networks while other non-domain joined networks, such as networks in airports or coffee shops, may be designated as "public" networks. Different profiles may be provided for private and public networks.

To simplify configuring the firewall, the networked computer may automatically identify its network context and select the appropriate profile for use based on a detected network context. When the networked computer has only one network connection, an appropriate profile may be readily selected based on the characteristics of that network connection. When the networked computer has multiple network connections, an appropriate set of firewall rules may be selected by selecting a profile based on levels of security provided by the applicable profiles. In the embodiments described, the selected profile is the profile applicable to the least secure network to which the networked computer is connected.

In the example in which a networked computer may be configured for domain, private and public networks, a profile associated with a public network may be regarded as less secure than a private network, which may be regarded as less secure than a domain network. With such a selection hierarchy programmed into the networked computer, when the networked computer is connected to more than one type of network, the profile associated with the least secure network may be selected and applied without express user input.

To further enhance the user experience, the networked computer may be programmed to apply a profile quickly and without unintentionally disrupting communications over established network connections. When a change in network configuration of the networked computer is detected, a new profile may be selected. Differences between a currently applied firewall rules and the set of firewall rules for the new profile may be determined. The differences may be applied by deleting previously configured rules that are not part of the new profile and adding rules that are in the new profile, but which the firewall was not previously configured to execute. The differences may be applied more quickly than deleting the previously configured rules and configuring rules of the new profile. Also, changing the firewall configuration according to such a process reduces the possibility that communications will be unintentionally blocked during the interval between when rules associated with an existing profile are deleted from the firewall configuration and when the firewall is configured for rules associated with a new profile.

Figure 1A:
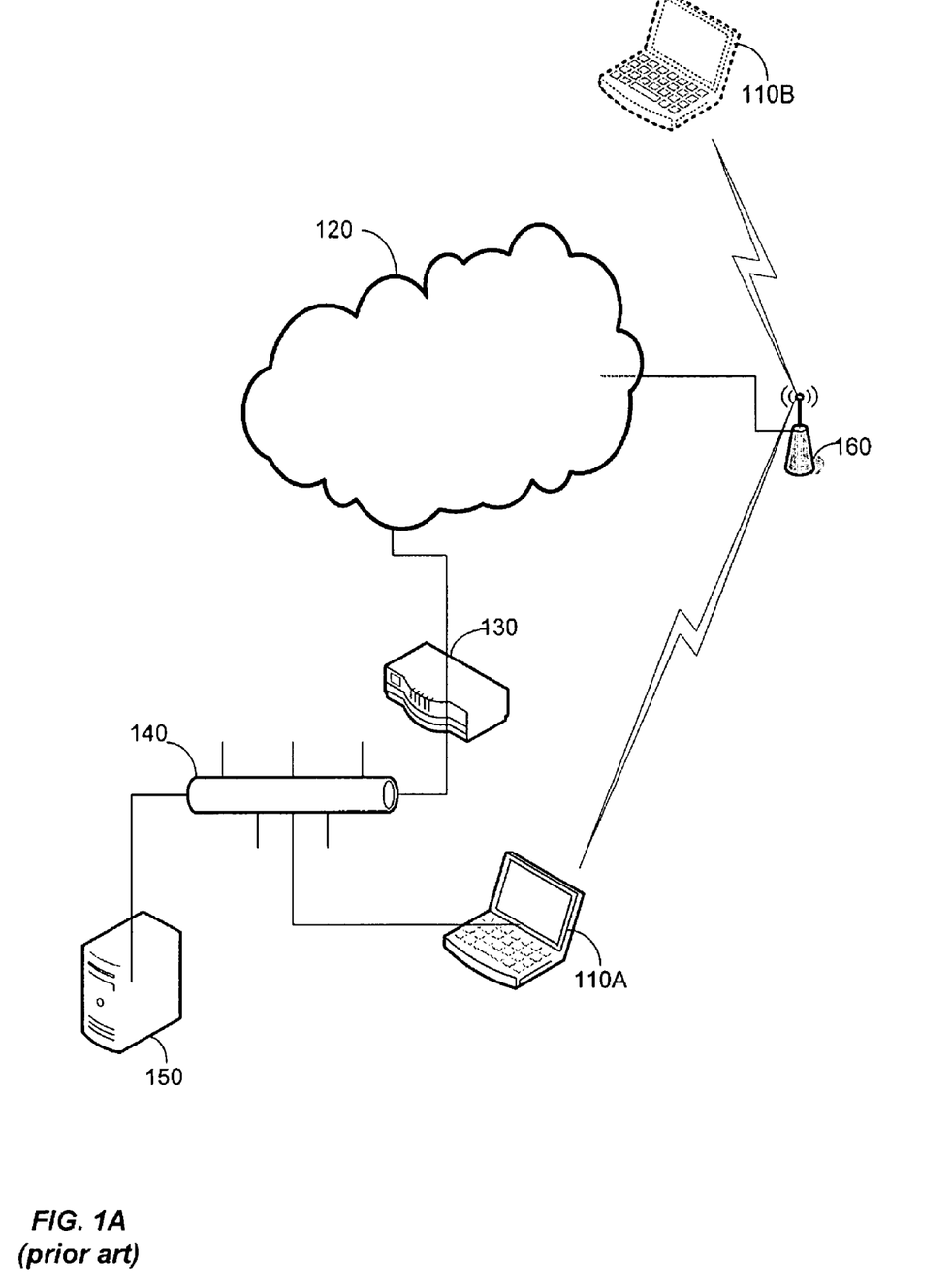
FIGS. 1A and 1B are sketches of prior art network configurations.

The desirability of simplifying configuration of a firewall is illustrated by FIG. 1. FIG. 1 provides an example of an environment in which a networked computer may be deployed. In this example, networked computer 110A is shown connected to a local area network (LAN) 140. Other devices, such as server 150, are also connected to LAN 140. With this configuration, networked computer 110A may exchange information with devices on LAN 140, such as server 150.

LAN 140 is shown connected to a broader network 120 through router 130. In the embodiment illustrated, network 120 may be the Internet. As shown, the networked computer is a laptop or other portable computing device. Accordingly, from time to time, networked computer 110A may be disconnected from LAN 140.

To provide network connectivity for a portable computing device even when not connected to a wired network, such as LAN 140, many laptops computers contain wireless network interfaces. Accordingly, networked computer 110A may be moved to a position denoted 110B where it may connect to network 120 through a wireless access point 160.

However, the wireless network interface within computer 110A may be active at other times, even when networked computer 110A is connected to LAN 140. Accordingly, FIG. 1A shows networked computer 110A configured for simultaneous connection to LAN 140 and to network 120 through wireless access point 160. In this context, though networked computer 110A may be configured with a profile applicable for when networked computer 110A is connected to LAN 140, that profile may not achieve desired results. For example, the profile associated with LAN 140 may provide very few restrictions on communications to or from networked computer 110A. Such a profile would, for example, be appropriate when networked computer 110A is communicating with server 150 over a managed network, which is likely relatively secure. However, communications with wireless access point 160 may come from devices that are not on the managed network and therefore could come from unauthorized third parties. Such communications could be used to cause damage to computer 110A or data stored on it. Further, such communications, if not restricted, could allow an unauthorized third party to gain access to other resources on LAN 140 through networked computer 110A. Accordingly, in scenarios in which a networked computer is connected to multiple networks, appropriate selection of a profile may impact whether a firewall provides an acceptable level of security.

Figure 1B:
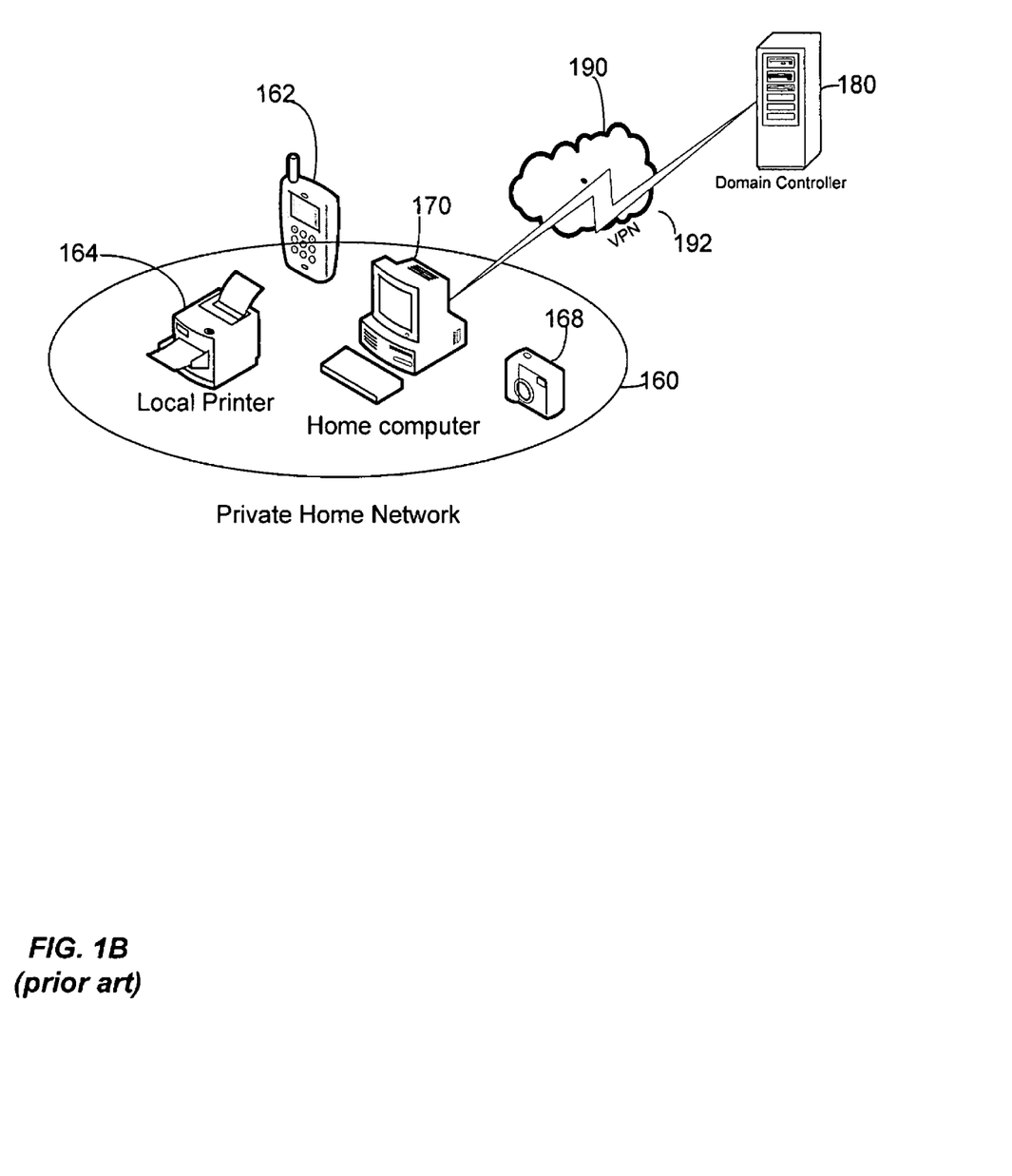

FIG. 1B illustrates another scenario in which a networked computer may be connected simultaneously to multiple networks and selection of a profile may determine whether a firewall provides an acceptable level of security.

In the scenario illustrated in FIG. 1B, a networked computer 170 is connected to a home network 160. Home network 160 may be classified as a "private" network and may provide access to one or more network devices. In the example illustrated, home network 160 allows networked computer 170 to access devices such as a portable computing device 162, a local printer 164 and a camera 168.

Additionally, networked computer 170, even though located in a home setting, may be configured to allow a user to perform work functions. In the example illustrated, networked computer 170 supports a network connection to a domain controller 180. Domain controller 180, for example, may be a domain controller in an enterprise network managed by the company for which a user of networked computer 170 works. Through a network connection to domain controller 180, a user of networked computer 170 may access work information from a home setting.

The network connection between networked computer 170 and domain controller 180 may pass over a public network 190, which may be the internet. To provide security over a public network, the connection between networked computer 170 and domain controller 180 may be implemented as a virtual private network (VPN) connection 192. A VPN connection 192 may provide a sufficient level of security that communications over VPN connection 192 may be afforded a very low level of filtering by a firewall in within networked computer 170. Accordingly, a profile associated with a domain network may be applied to a firewall within networked computer 170 when it is coupled to domain controller 180 over VPN connection 192. However, that profile may not be applicable for communications over home network 160. Accordingly, in the scenario illustrated in FIG. 1B, appropriate selection of a firewall profile for networked computer 170 may be necessary for the firewall to operate as intended.

FIGS. 1A and 1B also illustrate a further complexity that may occur when a networked computer has multiple profiles that may be applicable at different times. Time may be required to reconfigure a firewall as the applicable profile changes. While the firewall is being reconfigured, the networked computer may not provide an expected level of network communications. For example, networked computer 110A (FIG. 1A) is depicted as a mobile device. Accordingly, as it is operated, it may move in an out of range of wireless access point 160 or other wireless access points. Accordingly, the network configuration of networked computer 110A may change on a frequent basis. Deleting firewall rules established in one network configuration and reconfiguring the firewall with rules appropriate for a new configuration may take time. While the firewall is being reconfigured, the firewall may not appropriately pass or filter communications based on the current network configuration of networked computer 110A or the computing cost associated with reconfiguring a firewall may render a computing device effectively unusable for some period of time.

Figure 2:
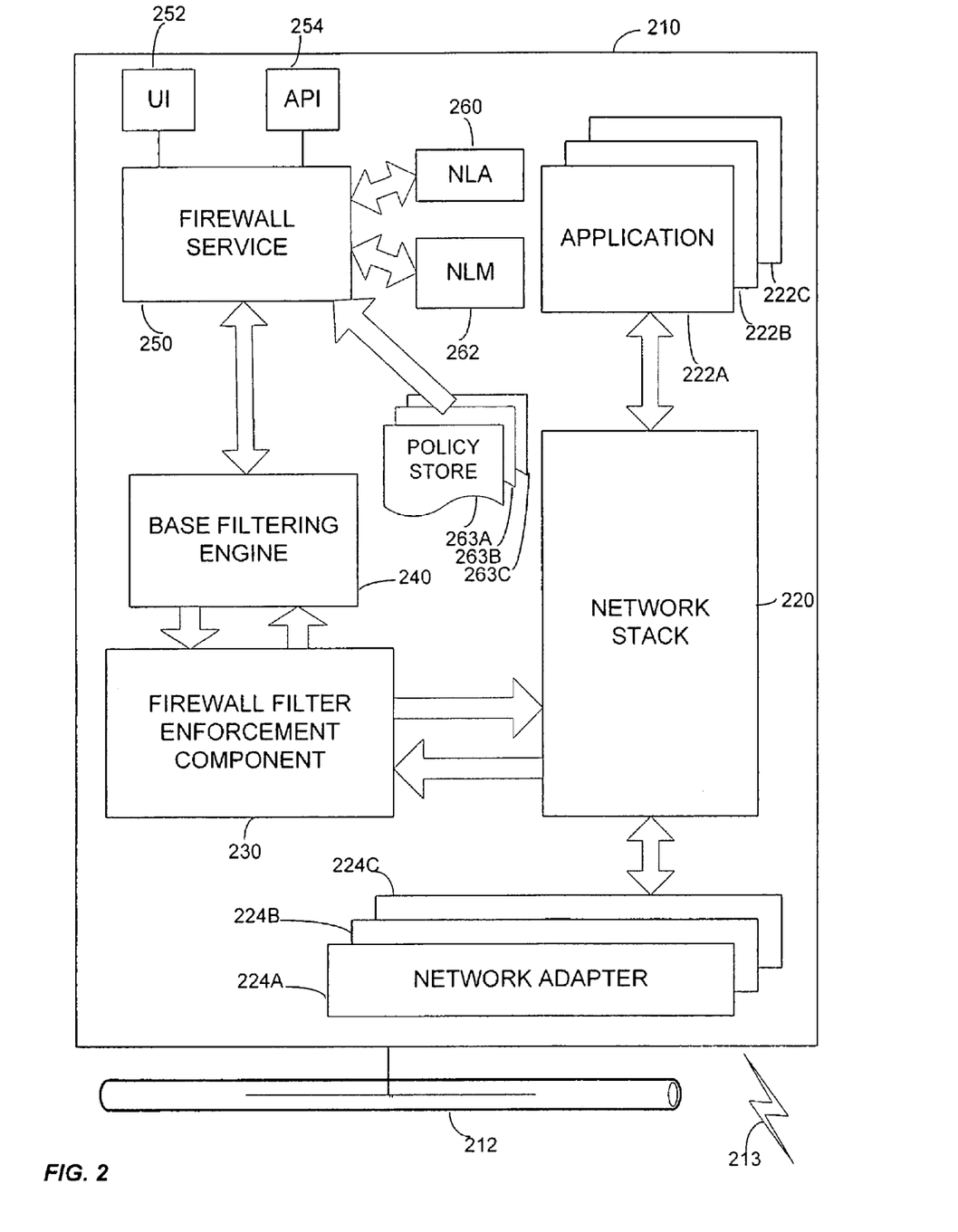
FIG. 2 is an architectural block diagram of a networked computer with a firewall that may be operated according to an embodiment of the invention.

According to embodiments of the invention, a networked computer, such as networked computers 110A or 170, may be configured to select and quickly apply a profile applicable for the network context of the computer. A networked computer with these capabilities may be constructed in any suitable way. In some embodiments, such a networked computer may be constructed using components as are known in the art. Though, modifications in a firewall service may be made to support selection and/or rapid application of firewall rules appropriate for a current network configuration. FIG. 2 illustrates an exemplary architecture of such a networked computer.

FIG. 2 is an architectural block diagram of a networked computer 210. Networked computer 210 may be any computer device configured to operate over any one or more networks. In the embodiment illustrated, a wired network 212 and a wireless network 213 are illustrated. However, many networked computers contain multiple network interfaces and, though not expressly shown, may interface to multiple wired and/or wireless networks. Accordingly, the number and type of networks to which a computer is connected is not a limitation on the invention.

Regardless of the specific type of networks to which network computer 210 is connected, it may be configured with one or more software components stored in a suitable computer-readable medium and adapted to process network traffic. Those components may process both incoming and outgoing network traffic and firewall filtering could apply to incoming traffic or outgoing traffic or both. The network traffic may be in any suitable form, which is frequently dictated by the protocol used by the network over which the network traffic is communicated. Frequently, network traffic will be in the form of TCP or UDP packets, but the specific form of the network traffic is not a limitation on the invention and messages in suitable form may be processed according to embodiments of the invention.

Network computer 210 may contain one or more components as is known in the art for processing network traffic. Such components may include network stack 220. In the embodiment illustrated, network traffic passes through network stack 220. Network stack 220 may be a network stack as is known in the art. However, any suitable network stack may be used.

Network stack 220 receives outgoing messages from applications 222A, 222B and 222C. Here, three applications are shown for simplicity, but networked computer 210 may contain any number or type of applications.

Network stack 220 interfaces with network adapters 224A, 224B and 224C. Each of the network adapters 224A . . . 224C provides an interface for a specific network, though more than one adapter may be provided to interface to the same network. Though three network adapters are illustrated in FIG. 2, any number or type of network adapters may be used within networked computer 210. Each of the network adapters 224A . . . 224C may have operating characteristics to support a specific form of network communication and may be implemented as is known in the art or in any other suitable way.

To provide security, network computer 210 is configured with a software firewall. The software firewall also may contain components as are known in the art. However, components of the software firewall may be implemented in any suitable way.

In the embodiment illustrated, the software firewall contains a firewall filter enforcement component 230, which may operate to filter network traffic using mechanisms as are known in the art. In the embodiment illustrated, firewall filter enforcement component 230 maintains a set of filters specifying, for each network adapter 224A . . . 224C, network traffic that should be passed or blocked. Firewall filter enforcement component 230 interfaces with network stack 220 to apply these filters to traffic passing through stack 220. As network stack 220 processes network messages, it interacts with firewall filter enforcement component 230 to determine whether each message should be passed or blocked.

In the embodiment illustrated, network stack 220 and firewall filter enforcement component 230 may be contained within the kernel of an operating system for network computer 210. The filters used by filter enforcement component 230 may be provided from the user mode portions of the operating system. The filters may be derived from user input or may be derived from execution of scripts or other program elements or otherwise derived in any other suitable way. Regardless of how filters are derived, the firewall filters may be provided to firewall filter enforcement component 230 via a user mode component. In the embodiment illustrated, base filtering engine 240 provides those filters to firewall filter enforcement component 230. Base filtering engine 240 may be a base filtering engine as in a conventional firewall. However, base filtering engine 240 may be implemented in any suitable way.

In the embodiment illustrated, base filtering engine 240 receives information defining firewall filters from firewall service 250. As in a firewall service in some known network computers, firewall service 250 may provide one or more interfaces through which firewall rules may be specified. In the embodiment illustrated, user interface 252 and application programming interface 254 illustrate interfaces through which firewall rules may be specified.

In the embodiment illustrated, firewall rules are stored in policy stores, 263A, 263B and 263C, which may contain firewall rules from one or more sources applicable in one or more network contexts. For example, policy store 263A may contain one or more profiles specified by a domain administrator. Policy store 263B may store one or more profiles provided by a user and policy store 263C may contain one or more profiles specified from other sources. However, the number and type of policy stores is not a limitation on the invention. Collectively, the policy stores 263A, 263B and 263C may store rules that create multiple profiles, each profile applicable in a different network context. For example, the policy stores 263A . . . 263C may contain a profile applicable for when networked computer 210 is domain joined. Another profile may contain rules applicable when networked computer 210 is connected to a private network. A further profile may contain rules applicable for when networked computer 210 is connected to a public network.

To operate as desired, firewall service 210 may obtain information concerning the networks to which networked computer 210 is connected. Using this information, firewall service 250 may select an appropriate set of rules from policy stores 263A . . . 263C to form a profile for the current network context of networked computer 210. In the embodiment illustrated, firewall service 250 obtains information about the current network context from two components. In the specific embodiment illustrated, firewall service 250 receives network context information from a network location awareness (NLA) component 260 and a network list manager (NLM) component 262.

Network location awareness component 260 may provide information about the network interfaces maintained by network computer 210. Network location awareness component 260 may be implemented using mechanisms as are known in the art and may output for each network interface information about the network that can be accessed through that interface. Additionally, network location awareness component 260 may monitor interfaces established or broken-down and output an indication when the network configuration of networked computer 210 changes. Such an indication may be used by firewall service 250 as a trigger to update firewall filters or information used to implement firewall filtering that depends on the network configuration of network computer 210.

NLM component 262 may be a component as is known in the art that may obtain information about networks to which networked computer 210 is connected. NLM component 262 may operate in any suitable way. For example, NLM component 262 may query network adapters 224A . . . 224C associated with active network connections maintained by network computer 210. However, NLM component 262 may obtain information about a network connectivity of networked computer 210 in any suitable way.

Regardless of the manner in which NLM component 262 obtains information about active network connections, NLM component 262 may maintain a list of currently connected networks. In the embodiments illustrated, NLM component may identify connected networks using globally unique identifiers (GUIDs), but any suitable identification of connected networks may be used.

In addition, NLM component 262 may maintain information about the type of each connected network. In the illustrated examples, networks may be of one of three types: "domain," "private" or "public." For example, networks of type "domain" may be identified using information obtained by NLA component 260, which may include an identification of a domain controller if one exists. Other types may be assigned based on user input. For example, as each new network connection is identified, if no type has been assigned to the network, a user of networked computer 210 may be prompted to specify a network type. In the example provided, networks that are not domain networks may be classified as either "private" or "public" based on user input. However, the number of types and the mechanism by which types are assigned is not critical to the invention.

In the embodiment illustrated, the network types associated with connected networks may correspond to profiles maintained within policy stores 263A . . . 263C. Accordingly, firewall service 250 may use information about the connected networks provided by NLM component 262 to select an appropriate profile. Firewall service 250 may perform this processing in response to a notification from NLA component 260 that the network configuration of networked computer 210 has changed.

Figure 3:
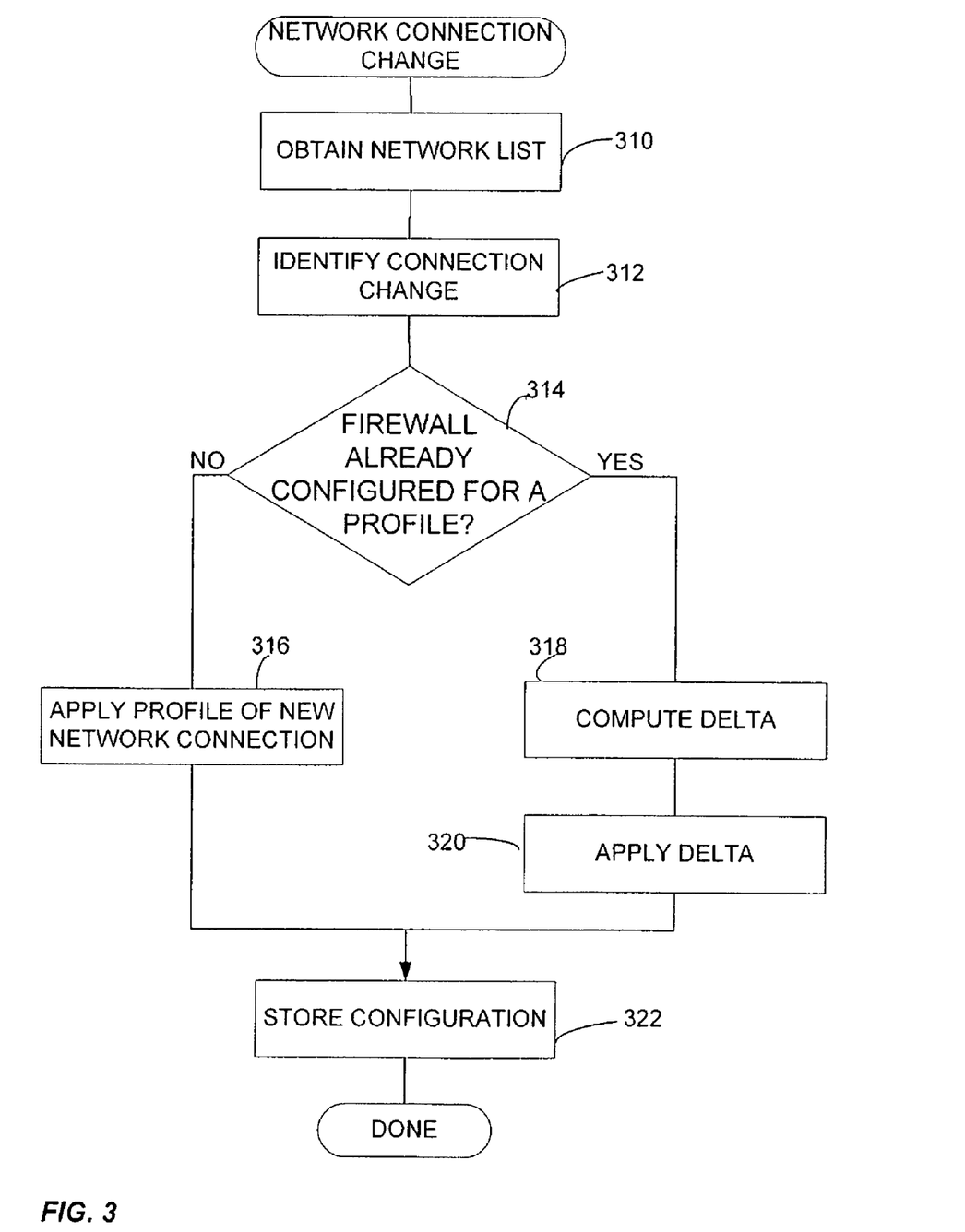
FIG. 3 is a flow chart of a process of programming firewall filters according to an embodiment of the invention.

FIG. 3 illustrates a process by which a networked computer configured according to an embodiment of the invention may operate. The process illustrated in FIG. 3 may be initiated in response to any suitable triggering event. In the embodiment illustrated, the process begins when a network change is detected, which may be the initial configuration of a network computer for connection to a network or any subsequent changes to any network connection.

Any suitable mechanism may be used to detect a network change. In the embodiment illustrated in FIG. 2, network computer 210 includes NLA component 260 that monitors network interfaces formed by computer 210. NLA component 260 may output an indication of a change in any network interface.

When a network connection change is detected, the process of FIG. 3 begins at block 310. A list of current networks is obtained at block 310. In a networked computer of the form pictured in FIG. 2, a network list may be obtained from NLM component 262. However, the specific mechanism by which a list of currently connected networks is obtained is not critical to the invention and any suitable mechanism may be used.

Regardless of the mechanism by which a network list is obtained, the processing proceeds to block 312 where the change or changes in the connected networks that triggered execution of the process of FIG. 3 are identified. Any suitable mechanism may be used to identify connection changes. As a simple example, the list obtained at block 310 may be compared to a previously obtained list to identify one or more network connections that have been added or deleted.

The process continues to decision block 314. At decision block 314 the process branches depending on whether the firewall is already configured to implement filtering according to a profile. If the firewall is not already configured, the process branches to block 316. If processing reaches block 316, the change that triggered execution of the process of FIG. 3 indicates a new network connection was formed. At block 316 a profile applicable to the new network connection may be applied as in a conventional firewall. For example, if the new network connection identified at block 312 was a connection to a networked classified as a domain network, firewall service 250 may retrieve from policy stores 263A . . . 263C rules defining a profile for a domain network. Similarly, if the new network connection is to a network classified as type "private" or "public," firewall service 250 may retrieve from policy stores 263A . . . 263C rules defining a profile appropriate for a private or public network, respectively. Firewall service 250 may then apply the rules in the selected profile through base filtering engine 240.

Thereafter, the process may continue to block 322. At block 322 the firewall configuration applied at block 316 may be stored. In the embodiment illustrated, the configuration may be stored at block 322 by storing representations of the rules applied at block 316 in a data structure. The data structure may be formed in computer readable media associated with network computer 210 or in any other suitable way. Storage of the configuration at block 322 allows for rapid reconfiguration of firewall when further network connection changes are detected, which may avoid causing the networked computer from being unavailable at frequent intervals or other undesirable effects of a computationally intensive reconfiguration of the firewall.

For example, if processing at decision block 314 identifies that the firewall is already configured with one or more rules from a previously applied profile, the process branches from decision block 314 to block 318. At block 318, differences between a profile applicable in the current network configuration and a previously applied configuration of a firewall are computed. This "delta" between a currently desired firewall configuration and a previous configuration may be computed by identifying rules applicable to a currently desired configuration and comparing those to a configuration previously stored by processing at block 322.

Regardless of how the delta is computed, the process may proceed to block 320. At block 320, the identified delta may be applied. Applying the delta may involve and and/or deleting rules. Rules that are not active in the current firewall configuration but were active in the previously stored configuration may be deleted. Rules that are active in the current configuration but were not active in the previously stored configuration may be added. By applying the delta, the computational cost of reconfiguring the firewall may be reduced.

In the embodiment illustrated, firewall service 250 may be configured to interface with base filtering engine 240 to specify rules to be added or deleted. Any suitable mechanism may be used to communicate changes to the current firewall configuration to base filtering engine 240. Similarly, base filtering engine 240 may be adapted to control firewall filter enforcement component 230 to add or delete specific filters corresponding to added or deleted rules, respectively. The specific format of these interfaces is not critical to the invention and any suitable interface format may be used to communicate the intended information.

Regardless of how the identified deltas are applied, once applied the process continues to block 322. At block 322, the previously stored configuration of the firewall is updated to reflect the current configuration achieved as a result of applying the deltas at block 320.

Figure 4:
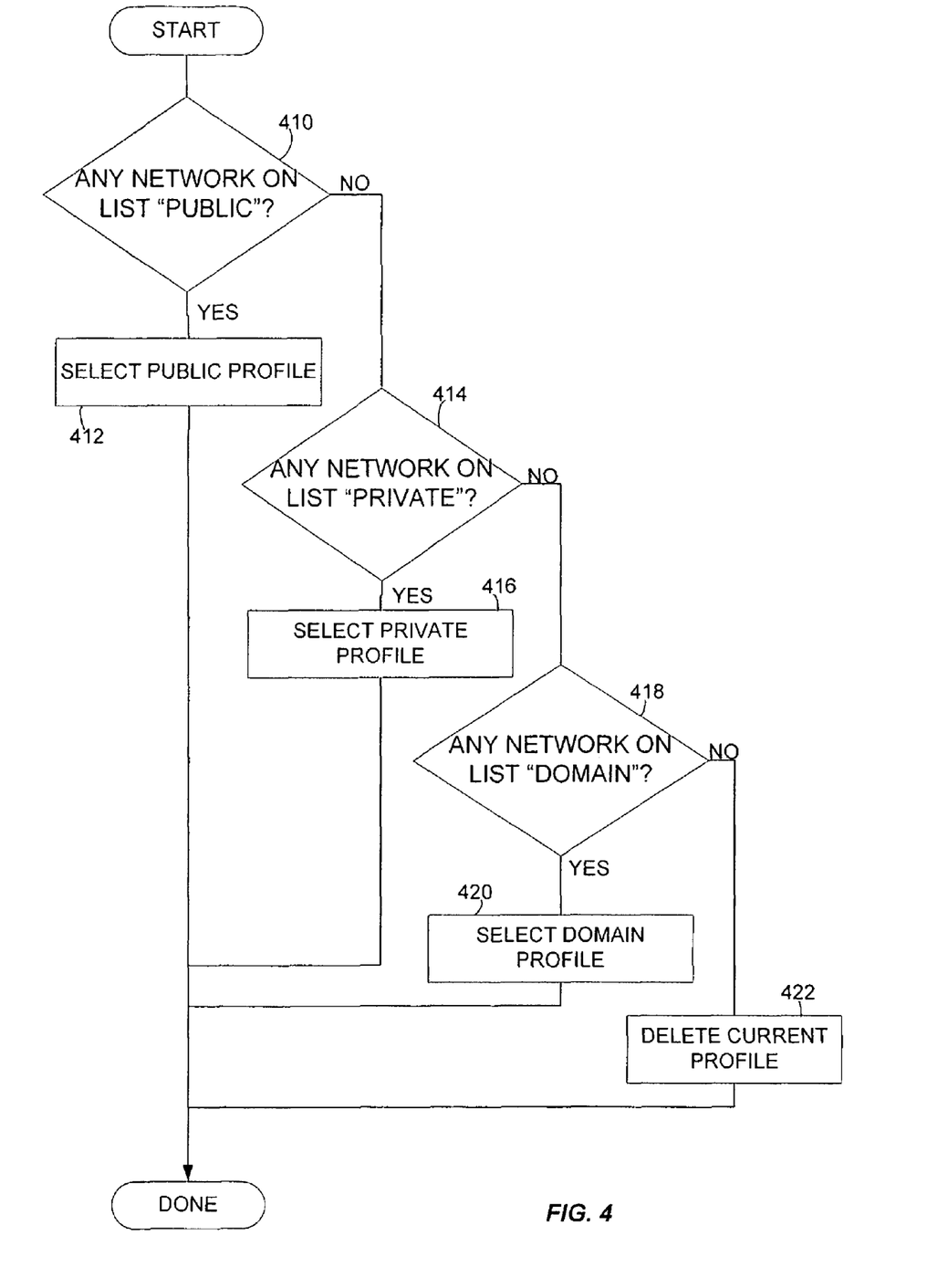
FIG. 4 is a flow chart of a process of selecting a profile in a multi-profile environment according to an embodiment of the invention.

The process illustrated in FIG. 3 may be performed to apply a profile applicable to a current network configuration regardless of how the applicable profile is identified. However, in some embodiments, it may be desirable for a networked computer capable of connecting to more than one network simultaneously to be configured to automatically select a profile based on any network or combination of networks over which active connections are established. FIG. 4 illustrates a process that may be performed to select an appropriate profile regardless of the number of networks to which a networked computer is connected. The process illustrated in FIG. 4 may be performed as part of the processing in block 318 (FIG. 3) or may be performed at any other suitable time during operation of networked computer 210.

The process of FIG. 4 begins at decision block 410. In the embodiment illustrated, processing at decision block 410 is based on a list of current network connections. The list used in the processing at decision block 410 may be the list obtained at block 310 (FIG. 3) or any other list obtained in any other suitable way.

The process branches depending on the types of networks included on the list. As described above, a network list produced by NLM 262 (FIG. 2) may contain a network type identifier for each network on the list. In such an embodiment, a network type may be readily identified. However, the specific mechanism by which a type is associated with each currently active network connection is not critical to the invention and any suitable mechanism may be used.

If any of the networks on the list of currently connected networks is classified as a "public" network, the process branches to block 412. If processing reaches block 412, a profile associated with the public network is selected.

In the embodiment illustrated in FIG. 4, a profile is selected to correspond to the least secure network for which there is an active network connection. Because the network type "public" is, in the example illustrated, regarded as the least secure network type, no further processing is required once a connection to a public network is identified and the public profile is selected. Accordingly, the process of FIG. 4 terminates after block 412.

Conversely, if no network on the list is a public network, the process branches from decision block 410 to decision block 414. At decision block 414, the process again branches depending on whether any network on the list of active network connections is a private network. If a private network is identified, the process branches to block 416 where the profile applicable to a private network is selected.

If processing reaches block 416, the least secure network for which there is an active connection is a private network. Accordingly, no further processing is required once the private network profile is selected at block 416, and the process may end after block 416. Conversely, if no network on the list of active network connections is a private network, the process proceeds to decision block 418.

The process may branch at decision block 418 based on whether any of the networks on the list of currently active network connections is classified as "domain" network. If any network is a domain network, the process branches to block 420. At block 420, an applicable domain profile may be selected and the process of FIG. 4 may thereafter terminate.

In the embodiment illustrated, three network types, public, private and domain, are supported. In the embodiment illustrated, these are the only firewall profiles supported so that, if processing reaches decision block 418 and no domain type network is identified on the list of active network connections, there is no network connection on the list of active network connections. In such a scenario, the network connection change that triggered the processing that resulted in the execution of the process of FIG. 4 was breakdown of a network connection resulting in no active network connections. Accordingly, when processing branches from decision block 418 to block 422, processing appropriate upon breakdown of a last active network connection for a networked computer may be performed. In the embodiment illustrated, that processing may involve deleting the current network profile used to configure firewall filters. However, in other embodiments, other processing may be performed at block 422. For example, when there are no active network connections the firewall may be reconfigured to the least secure network configuration. In such an embodiment, processing at block 422 may involve selecting and applying the public profile, which is deemed the least secure profile. As a further example, some embodiments may support an "unknown" profile that may be used whenever the computing device is connected to a network for which no type could be identified. In such an embodiment, processing at block 422 may entail configuring the firewall with the default profile.

Figure 5A:
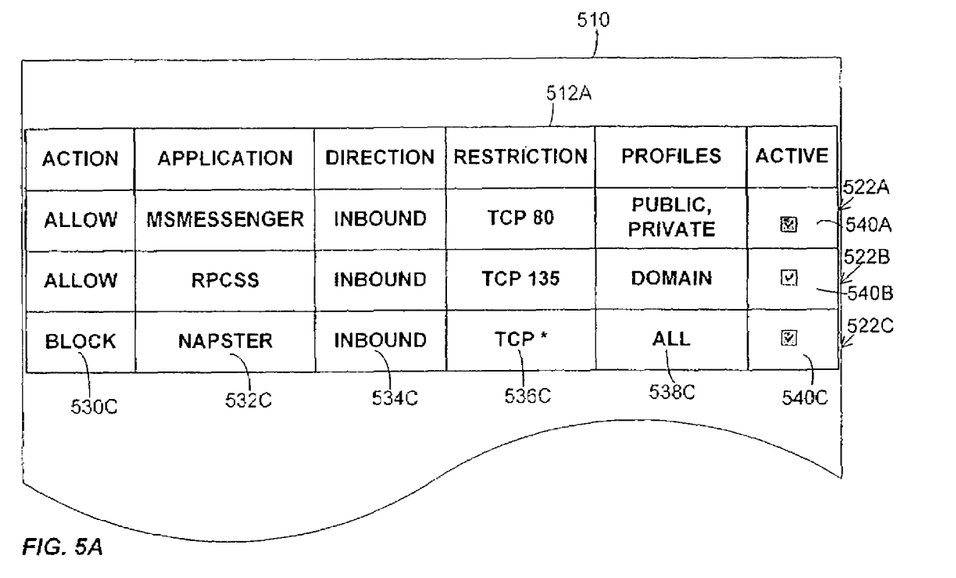
FIGS. 5A and 5B are sketches of a data structure according to an embodiment of the invention in alternative operating states.
Figure 5B:
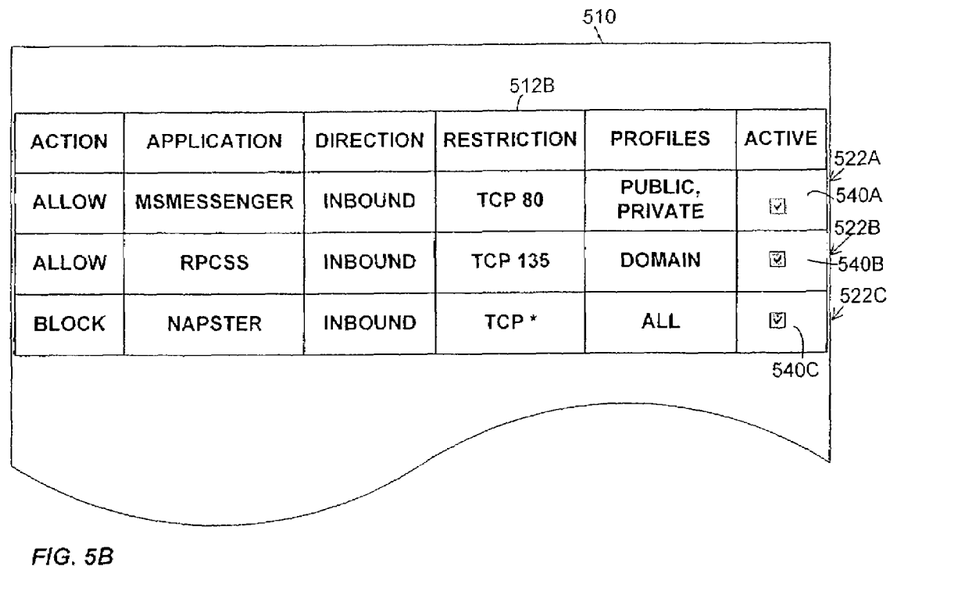

The processing represented by the flow charts of FIGS. 3 and 4 may be implemented in any suitable way in any suitable components of a networked computer. As an example, FIGS. 5A and 5B illustrate a data structure that may be used to identify deltas in a current applied profile. FIG. 5A illustrates a computer readable media 510 in which a data structure 512A is formed. In the embodiment illustrated, data structure 512A is implemented with a plurality of rows, of which rows 522A, 522B and 522C are illustrated. Each of the rows 522A . . . 522C stores information defining a firewall rule. In the example of FIG. 5A three rows 522A . . . 522C are shown. However, a networked computer may process any number of firewall rules. Accordingly, data structure 512A may have more or less than three rows.

In the embodiment illustrated each rule is represented by values stored in multiple fields in a row. Taking row 522C as illustrative, fields 530C, 532C, 534C, 536C, 538C and 540C are illustrated. However, the number and types fields used for storing information representing a firewall rule is not a limitation on the invention.

In the embodiment illustrated, field 530C defines the action performed when the rule is applied. In the case of the rule in row 522C, field 530C contains a value "block" which indicates that when the rule is applicable, traffic is blocked. Other values in such a field may indicate other actions are to be performed when the rule is applicable. For example, row 522B represents a rule with a value of "Allow" for a rule. Though text values are used to depict values in fields of data structure 512A, text is shown for simplicity of illustration. In an actual implementation of a data structure, values may be represented by codes, indexes or values of any suitable format.

Field 532C contains a value identifying the application to which the rule applies. In this example, the application is identified as "napster." Any suitable format may be used to identify the application.

Field 534C indicates the type of traffic to which the rule applies. In this example, field 534C contains a value of "inbound," indicating that the rule applies to inbound traffic. Though not shown in FIG. 5A, other rules may apply to outbound traffic or to both inbound and outbound traffic.

Field 536C stores a value indicating restrictions on the applicability of the rule. In this example, field 536C stores a value of "TCP *" which indicates that the rule specified in row 522C applies to messages received through any TCP port. In other scenarios, other values in field 536C may indicate other applicable restrictions. For example, some values in field 536C may signify a specific port or ports to which the rule applies. In other scenarios, no value may be stored in field 536C, indicating that no additional restrictions apply on the applicability of the rule.

Field 538C stores a value indicating profiles in which the rule in 522C is applicable. In the example of FIG. 5A, field 538C stores a value of "all," indicating that the rule applies in all profiles. In the example of networked computer 210 (FIG. 2), which supports network types of public, private and domain, field 538C may store a value indicating any of the supported network types or any combination of the supported network types. As an example, the rule specified in row 522B is applicable for "domain" type networks and the rule in row 522A is applicable to "public" and to "private" type networks.

Field 540C may store a value indicating whether the rule in row 522C is currently active. In FIG. 5A, the value in field 522C is illustrated graphically with a check mark. Such a representation is for simplicity of illustration and an actual value may be stored in field 540C as a code or in any other suitable way.

In the scenario illustrated, field 540C stores a value indicating that the rule is active. Conversely, field 540B in row 522B contains a value that indicates the rule identified in row 522B is not currently active and field 540A stores a value indicating that the rule defined in row 522A is currently active.

In the operating condition illustrated in FIG. 5A, fields 540A, 540B and 540C depict an operating state that may occur when the currently selected profile is "public" profile. Because the rule defined in row 522C is active in all profiles, field 540C indicates that rule is active. Similarly, because the rule defined in row 522A is active in either a "public" or "private" profile, field 540A indicates that that rule is currently active. However, because the rule defined in row 522B is active only in the "domain" profile, field 540B indicates that the rule defined in that row is not currently active.

Accordingly, FIG. 5A illustrates a data structure that may be used to store a configuration as part of the processing a block 322 (FIG. 3). In the embodiment illustrated in FIG. 5A all available rules may be stored in data structure 512A. Updating the configuration may involve changing the values indicating whether the rule is currently active.

In such an embodiment, changing the applicable profile may involve changing the values indicating which rules are currently active. For example, FIG. 5B illustrates a data structure 512B that may be data structure 512A updated to reflect a change in applicable profile from "public" to "domain." Accordingly, FIG. 5B shows that the rule in row 522A is no longer active. However, the rule in row 522B, applicable in the "domain" profile, is shown to be currently active in the scenario pictured in FIG. 5B. The rule in row 522C is shown to be still active in the scenario picture in FIG. 5B.

Comparison of FIGS. 5A and 5B illustrates a process by which changes in a firewall configuration may be readily identified. By comparing field 540A in the data structure in state 512B to the corresponding field in data structure 512A, a change can be readily detected. Specifically, deleting the rule identified in row 522A from the active configuration is part of the delta that must be performed to transition from the state depicted by FIG. 5A to the state depicted in FIG. 5B. Similarly, comparison of field 540B in data structure 512B to the corresponding field in data structure 512A indicates that adding the rule defined by row 522B is also part of the delta.

A similar comparison performed for field 540C reveals that changes to the rule defined by row 522C are not part of the delta.

Accordingly, networked computer 210 may be quickly reconfigured from a public profile to a domain profile by deleting any filters programmed based on rule 522A and adding filters corresponding to the rule defined in row 522B. As can be seen from even the simple example illustrated in FIGS. 5A and 5B, reconfiguring by applying a delta may require fewer steps than deleting the rules associated with a previously configured profile and applying the rules associated with a current profile and may therefore occur much more rapidly. For example, to transition from the state depicted in FIG. 5A to the state depicted in FIG. 5B by deleting a previously configured profile and applying a new profile involves four steps. Those steps would include deleting rules 522A and 522C to remove the configuration illustrated in FIG. 5A. Two additional steps are then required to add the rules in rows 522B and 522C to create the configuration illustrated in FIG. 5B. In contrast, to apply a delta, only two steps are required. The rule defined in row 522A is deleted and the rule defined by row 522B is applied.

Accordingly, a networked computer configured with a firewall profile as described above may provide multiple benefits to a user. For example, the networked computer may apply the most secure profile applicable to any connected network regardless of the categorization of connected networks. Additionally, the firewall may dynamically react to network topology changes and maintain the desired level of host security. Further, the process illustrated in FIGS. 3 and 4 allows a policy update to be performed without severing any preauthorized active connections that continue to be permitted in a new profile. For example, if an application is permitted to receive inbound messages in both a "domain" and a "public" profile, in a transition from a "domain" profile to a "public" profile, a firewall may maintain its filter that allows such communications so that such communications are not disrupted during the transition.

Further, applying deltas as described above allows policy updates to be performed without incurring a significant performance penalty.

Also, it should be noted that processing according to embodiments of the invention may include storing information that identifies the currently enforced firewall profile. In the embodiment described above, this information was stored to allow the identification of deltas when a new profile is required. However, once stored, this information may be made available to applications. For example, in some embodiments, API 254 may be modified support a method that provides to an application such as applications 222A . . . 222C (FIG. 2) to receive information about the currently enforced profile. In this way, application developers may code applications to perform appropriately based on the currently enforced profile. For example, applications may be constructed to recognize that they cannot receive certain types of communications in certain network contexts and may therefore avoid sending requests for that information or reporting a problem to a user when the information is not received.

Furthermore, in embodiments in which configuration of a firewall occurs automatically upon detection of a network configuration change, an end user may be protected when an unintended connection is made to a previously connected public network. For example, a user may configure a networked computer for access to a VPN or other relatively secure network at a time when the computer is not connected to a public network. However, the networked computer may be a mobile computing device and may be brought into range of wireless access point. A similar effect may be achieved if a wireless access point is brought into the vicinity of the networked computer. Regardless, a wireless network connection may be established over a relatively unsecured network while the networked computer is configured with relatively few firewall restrictions that would be appropriate for a connection to a relative secure network, such as a VPN. In embodiments in which new connections are detected, a profile applicable for a public network may be applied, and an end user may be protected from access through the unintended wireless connection.

As another consequence of the process described, sufficient security may be provided for a computer that is connected a domain environment through a VPN connection or other relatively secure network to allow the device to access resources in a private network that is simultaneously connected to the networked computer. In this way, an end user may continue to utilize private resources, such a printers and media players, while connected to a domain environment.

Further, as illustrated by comparison of FIG. 5A to FIG. 5B, firewall rules applicable to one or more applications may be changed automatically, without a pop-up or other user prompt requesting input on the appropriate firewall configuration. This reconfiguration can occur without the application running with administrative privileges, which could in turn create a security risk.

In embodiments including a computing device connectable to a network, the computing device comprising a set of firewall rules applicable when the computing device is connected to the network, a method may comprise: in response to an indication that the commuting device is connected to the network, determining a difference between the set of rules and rules upon which the firewall is configured to operate; and altering a configuration to the firewall based upon the difference.

In the embodiments including a computing device connectable to a plurality of networks, the computing device comprising a plurality of sets of firewall rules, each set of rules defined for use when the computing device is connected to a network having a type, a method may comprise: in response to an indication that the computing device is connected to a network of the plurality of networks, selecting a set of the plurality of sets of rules: and configuring a firewall with selected set of rules. the selecting a set of rules may include automatically selecting a set of rules. The automatically selecting the set of rules may include changing the firewall rules applicable to the application without executing the application with administrative privileges. When the networked computer is connected to two or more networks, selecting a set may comprise selecting a set of rules defined for use when the computing device is connected to a least secure of the two or more networks.

In embodiments, a computer-readable medium may comprise computer-executable instructions that, when executed, perform a method comprising: identifying differences between a new set of firewall rules and a current set of firewall rules; and altering the configuration of firewall using the identified differences.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device connectable to a plurality of networks, the method comprising:
   in response to an indication that a network configuration of the computing device has changed:
      determining if the computing device has two or more active network connections;
      selecting a set of firewall rules of a plurality of sets of firewall rules,
         each set of the plurality of sets of firewall rules defined for use when the computing device is connected to a network having a type,
         when the computing device has two or more active network connections, the selected set of firewall rules is a set of firewall rules defined for use when the computing device is connected to a least secure of the two or more active network connections; and
      configuring a firewall with the selected set of firewall rules, the configuring the firewall comprising:
         determining the firewall is already configured with one or more rules from a previously applied profile;
         computing a delta between the selected set of firewall rules and the one or more rules from the previously applied profile, the delta excluding a rule when the rule is common to the selected set of firewall rules and the previously applied profile;
         applying the computed delta to the firewall configuration for all connected networks regardless of the type of the connected network, the applying the computed delta comprising at least one of (a) deletion of a rule or (b) addition of a rule.

2. The method of claim 1, wherein the selecting the set of firewall rules comprises automatically selecting the set of firewall rules.

3. The method of claim 2, wherein automatically selecting a set of firewall rules comprises changing the firewall rules applicable to an application without executing the application with administrative privileges.

4. The method of claim 1, further comprising:
   obtaining a first list of current networks;
   obtaining a second list of current networks, the obtaining the second list occurring after the obtaining the first list; and
   identifying at least one connection change based on the first list of current network and the second list of current networks,
      the indication that the network configuration of the computing device has changed based on the identified at least one connection change.

5. The method of claim 2, further comprising:
   determining if the indication that the network configuration has changed corresponds to a breakdown of a last active network connection for the computing device; and
   when the indication that the network configuration has changed corresponds to the breakdown of the last active network connection for the computing device:
      the selected set of firewall rules is a set of firewall rules having a type defined for use when the computing device is connected to a least secure network type.

6. The method of claim 2, further comprising:
   determining if there are zero active network connections having a recognized type; and
   when there are zero active network connections having a recognized type:
      the selected set of firewall rules is a set of firewall rules defined for use when the computing device is connected to an unknown network type.

7. One or more computer-readable storage medium, the one or more computer-readable storage medium not consisting of signals, the one or more computer-readable storage medium storing at least one program module, the at least one program module configured to, when executed, cause at least one processor to implement acts, the acts comprising:
   in response to an indication that a network configuration of a computing device has changed:
      determining if the computing device has two or more active network connections;
      selecting a set of firewall rules of a plurality of sets of firewall rules, each set of the plurality of sets of firewall rules defined for use when the computing device is connected to a network having a type, when the computing device has two or more active network connections, the selected set of firewall rules is a set of firewall rules defined for use when the computing device is connected to a least secure of the two or more active network connections; and configuring a firewall with the selected set of firewall rules, the configuring the firewall comprising:

determining the firewall is already configured with one or more rules from a previously applied profile;

identifying a delta between the selected set of firewall rules and the one or more rules from the previously applied profile, the delta excluding a rule when the rule is common to the selected set of firewall rules and the previously applied profile;

applying the computed delta to the firewall configuration for all connected networks regardless of the type of the connected network, the applying the computed delta comprising at least one of (a) deletion of a rule or (b) addition of a rule.

8. The one or more computer-readable storage medium of claim 7, wherein the selecting the set of firewall rules comprises automatically selecting the set of firewall rules.

9. The one or more computer-readable storage medium of claim 8, wherein automatically selecting a set of firewall rules comprises changing the firewall rules applicable to an application without executing the application with administrative privileges.

10. The one or more computer-readable storage medium of claim 7, the acts further comprising:

obtaining a first list of current networks;

obtaining a second list of current networks, the obtaining the second list occurring after the obtaining the first list; and identifying at least one connection change based on the first list of current network and the second list of current networks, the indication that the network configuration of the computing device has changed based on the identified at least one connection change.

11. The one or more computer-readable storage medium of claim 7, the acts further comprising:

determining if the indication that the network configuration has changed corresponds to a breakdown of a last active network connection for the computing device; and when the indication that the network configuration has changed corresponds to the breakdown of the last active network connection for the computing device:

the selected set of firewall rules is a set of firewall rules having a type defined for use when the computing device is connected to a least secure network type.

12. The one or more computer-readable storage medium of claim 7, the acts further comprising:

determining if there are zero active network connections having a recognized type; and when there are zero active network connections having a recognized type:

the selected set of firewall rules is a set of firewall rules defined for use when the computing device is connected to an unknown network type.

13. A system comprising a computing device connectable to a plurality of networks, the computing device comprising:

at least one processor; and at least one computer-readable storage medium communicatively coupled to the at least one processor, the at least one computer-readable storage medium comprising one or more programs that, when executed on the computing device, cause the computing device to perform steps, the steps comprising:

in response to an indication that a network configuration of the computing device has changed:

determining if the computing device has two or more active network connections;

selecting a set of firewall rules of a plurality of sets of firewall rules, each set of the plurality of sets of firewall rules defined for use when the computing device is connected to a network having a type, when the computing device has two or more active network connections, the selected set of firewall rules is a set of firewall rules defined for use when the computing device is connected to a least secure of the two or more active network connections; and configuring a firewall with the selected set of firewall rules, the configuring the firewall comprising:

determining the firewall is already configured with one or more rules from a previously applied profile;

determining a delta between the selected set of firewall rules and the one or more rules from the previously applied profile, the delta excluding a rule when the rule is common to the selected set of firewall rules and the previously applied profile;

applying the computed delta to the firewall configuration for all connected networks regardless of the type of the connected network, the applying the computed delta comprising at least one of (a) deletion of a rule or (b) addition of a rule.

14. The system of claim 13, wherein the selecting the set of firewall rules comprises automatically selecting the set of firewall rules.

15. The system of claim 14, wherein automatically selecting a set of firewall rules comprises changing the firewall rules applicable to an application without executing the application with administrative privileges.

16. The system of claim 13, the steps further comprising:

obtaining a first list of current networks;

obtaining a second list of current networks, the obtaining the second list occurring after the obtaining the first list; and identifying at least one connection change based on the first list of current network and the second list of current networks, the indication that the network configuration of the computing device has changed based on the identified at least one connection change.

17. The system of claim 13, the steps further comprising:

determining if the indication that the network configuration has changed corresponds to a breakdown of a last active network connection for the computing device; and when the indication that the network configuration has changed corresponds to the breakdown of the last active network connection for the computing device:

the selected set of firewall rules is a set of firewall rules having a type defined for use when the computing device is connected to a least secure network type.

18. The system of claim 13, the steps further comprising:
determining if there are zero active network connections having a recognized type; and
when there are zero active network connections having a recognized type:
the selected set of firewall rules is a set of firewall rules defined for use when the computing device is connected to an unknown network type.

* * * * *

UNITED STATES PATENT AND TRADEMARK OFFICE
CERTIFICATE OF CORRECTION

| | |
|---|---|
| PATENT NO. | : 7,941,838 B2 |
| APPLICATION NO. | : 11/891379 |
| DATED | : May 10, 2011 |
| INVENTOR(S) | : Gerardo Diaz Cuellar et al. |

It is certified that error appears in the above-identified patent and that said Letters Patent is hereby corrected as shown below:

In column 13, line 33, delete "commuting" and insert -- computing --, therefor.

In column 13, line 36, delete "to" and insert -- of --, therefor.

In column 13, line 36, delete "upon" and insert -- on --, therefor.

In column 13, line 39, after "In" delete "the".

In column 13, line 46, delete "rules:" and insert -- rules; --, therefor.

In column 13, line 47, delete "the" and insert -- The --, therefor.

In column 13, line 48, delete "a" and insert -- the --, therefor.

In column 13, line 50, delete "the" and insert -- an --, therefor.

Signed and Sealed this
Nineteenth Day of July, 2011

David J. Kappos
*Director of the United States Patent and Trademark Office*